United States Patent
Larsson et al.

(10) Patent No.: US 9,451,620 B2
(45) Date of Patent: Sep. 20, 2016

(54) BASE STATION AND METHOD FOR POSITIONING SUPPORT

(75) Inventors: Daniel Larsson, Vallentuna (SE); Pål Frenger, Linköping (SE); Dirk Gerstenberger, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 141 days.

(21) Appl. No.: 14/118,594

(22) PCT Filed: Jun. 16, 2011

(86) PCT No.: PCT/SE2011/050760
§ 371 (c)(1),
(2), (4) Date: Nov. 19, 2013

(87) PCT Pub. No.: WO2012/173540
PCT Pub. Date: Dec. 20, 2012

(65) Prior Publication Data
US 2014/0141792 A1    May 22, 2014

(51) Int. Cl.
*H04W 72/04* (2009.01)
*H04W 64/00* (2009.01)
*H04W 52/02* (2009.01)
*H04W 88/08* (2009.01)

(52) U.S. Cl.
CPC ..... *H04W 72/0493* (2013.01); *H04W 52/0206* (2013.01); *H04W 64/00* (2013.01); *H04W 88/08* (2013.01)

(58) Field of Classification Search
CPC .................................................. H04W 72/0493
See application file for complete search history.

(56) References Cited

U.S. PATENT DOCUMENTS

| | | | |
|---|---|---|---|
| 2011/0124347 A1 | 5/2011 | Chen et al. | |
| 2011/0128903 A1* | 6/2011 | Futaki et al. | 370/312 |
| 2011/0222434 A1* | 9/2011 | Chen | 370/254 |
| 2012/0034948 A1 | 2/2012 | Wang et al. | |
| 2014/0113676 A1* | 4/2014 | Hamalainen et al. | 455/522 |

FOREIGN PATENT DOCUMENTS

| | | |
|---|---|---|
| EP | 2107847 A1 | 10/2009 |
| WO | 2010118676 A1 | 10/2010 |

* cited by examiner

*Primary Examiner* — Mazda Sabouri
(74) *Attorney, Agent, or Firm* — Coats & Bennett, P.L.L.C.

(57) ABSTRACT

The present invention relates to a base station (BS) and to a method for supporting UE positioning measurements in a wireless communication system. The method comprises transmitting (610) signals associated with a first cell, where the signals comprise positioning reference signals. The method also comprises transmitting (620) signals associated with a second cell, wherein the second cell is configured to have a lower transmission capacity than the first cell, and discontinuing (630) the transmission of at least one signal associated with the first cell except for the positioning reference signals. The energy consumption of the BS may thus be reduced while still supporting accurate positioning measurements.

31 Claims, 8 Drawing Sheets

Transmit signals comprising PRS associated with a first cell — 610

Transmit signals associated with a second cell with lower transmission capacity than first cell — 620

Discontinue transmission of at least one signal associated with the first cell except for the PRS — 630

BASE STATION AND METHOD FOR POSITIONING SUPPORT

TECHNICAL FIELD

The disclosure generally relates to support of user equipment positioning in a wireless communication system. In particular it relates to a base station (BS) and a method in a BS of a wireless communication system for supporting user equipment positioning measurements.

BACKGROUND

Figure 1A:
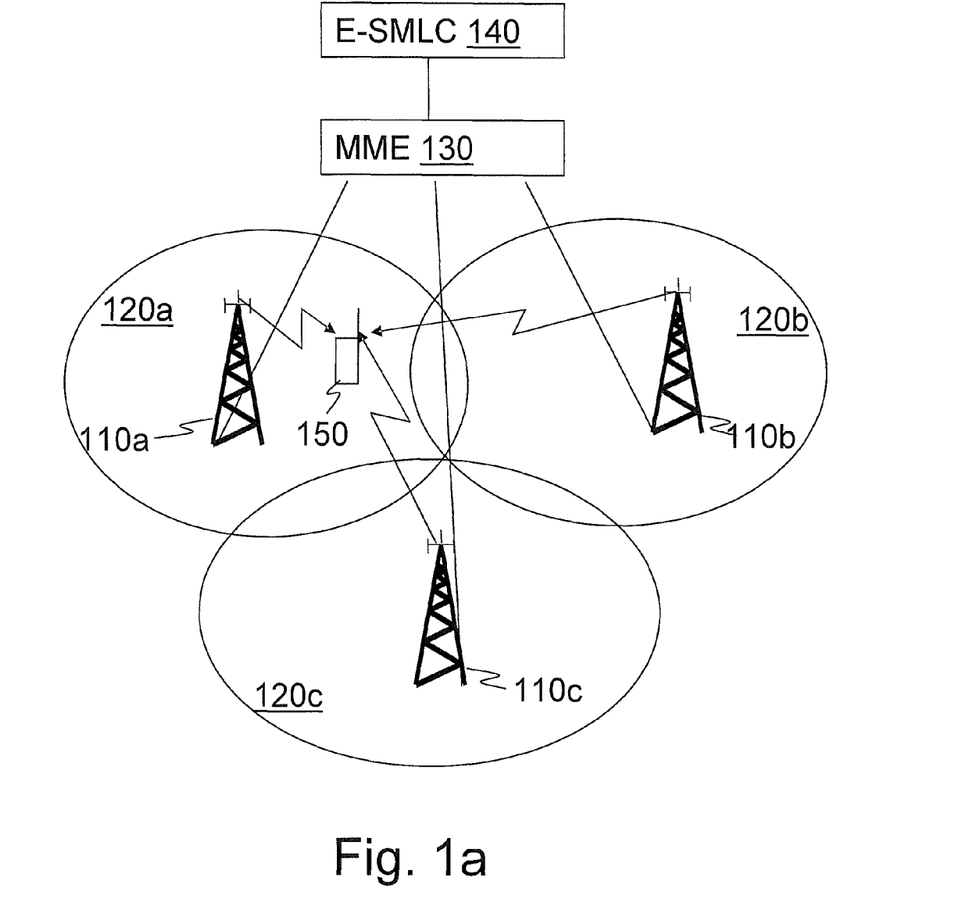
FIG. 1a is a schematic illustration of a conventional wireless communications system wherein embodiments may be implemented.

The Universal Mobile Telecommunication System (UMTS) is one of the third generation mobile communication technologies designed to succeed GSM. Long Term Evolution (LTE) is a project within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a user equipment (UE) 150 is wirelessly connected to a base station (BS) 110a commonly referred to as an evolved NodeB (eNodeB), as illustrated in FIG. 1a. Each eNodeB 110a-c transmits signals associated with a cell 120a-c, and are connected to the core network. In LTE, the eNodeBs 110a-c are connected to a Mobility Management Entity (MME) 130 in the core network.

UE Positioning

UE positioning is a process of determining UE coordinates in space. Once the coordinates are available, they may be mapped to a certain place or location. The mapping function and delivery of the location information on request are parts of a location service which is required for basic emergency services. Services that further exploit location knowledge or that are based on the location knowledge to offer customers some added value are referred to as location aware and location based services. The possibility of identifying a wireless device's geographical location in the network has enabled a large variety of commercial and non-commercial services, e.g., navigation assistance, social networking, location-aware advertising, and emergency calls. Different services may have different positioning accuracy requirements imposed by an application. Furthermore, requirements on the positioning accuracy for basic emergency services defined by regulatory bodies exist in some countries. An example of such a regulatory body is the Federal Communications Commission regulating the area of telecommunications in the United States.

The major driving force for location based services is emergency positioning, denoted E-911 positioning in North America. The accuracy requirements for E-911 positioning are quite stringent, which has lead to a technical solution with Assisted Global Positioning System (A-GPS) as the main positioning method. One or several fallback positioning methods are also normally implemented to cover up where A-GPS performs badly, e.g. indoors or in urban canyons. Common fallback positioning methods are cell identity (CID) positioning, timing advance (TA) positioning, fingerprinting positioning as well as Time Difference Of Arrival (TDOA) based positioning methods in the uplink or downlink.

A TDOA method relies on measurements on known reference radio signals from multiple BSs. The measurements are performed by means of correlation with the known signals from the BSs measured upon. One example situation in an LTE network is depicted in FIG. 2.

Figure 2:
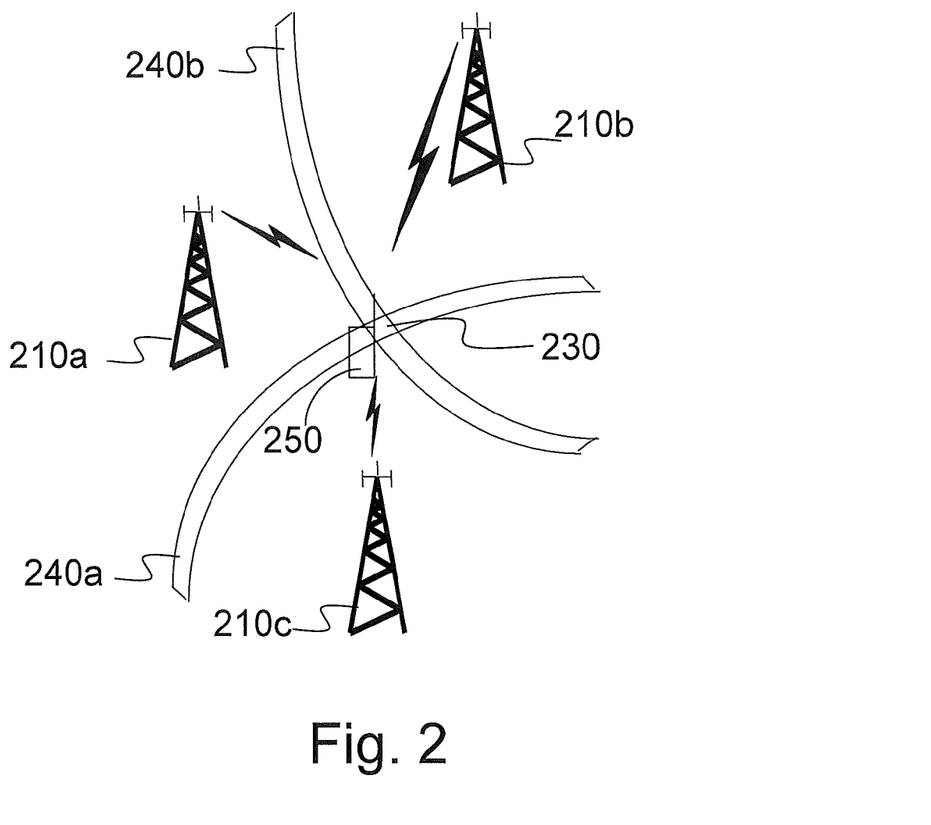
FIG. 2 is a schematic illustration of the TDOA principle.

Assuming that the measurements are successful for a number of cells, three of which are depicted in FIG. 2, the following relations between the measured Time Of Arrivals (TOA) in the terminal or UE, the transmission times from the BSs, in this case the eNodeBs, and the distances between the UEs and the eNodeBs apply:

$$t_{TOA,1} + b_{clock} = T_1 + \|r_1 - r_{Terminal}\|/c$$
$$\vdots$$
$$t_{TOA,n} + b_{clock} = T_n + \|r_n - r_{Terminal}\|/c.$$

Here $t_{TOA,i}$, $i=1, \ldots, n$ denotes the measured TOAs in the UE, $T_i$, $i=1, \ldots, n$ denotes the transmission times from the eNodeBs and c is the speed of light. The boldface quantities are the vector locations of the eNodeBs and the UE. The variable $b_{clock}$ denotes the unknown clock bias of the UE with respect to the cellular system time. In TDOA positioning, the time of arrival differences with respect to the serving site are formed according to:

$$t_{TDOA,2} = t_{TOA,2} - t_{TOA,1} = T_2 - T_1 + \|r_2 - r_{Terminal}\|/c - \|r_1 - r_{Terminal}\|/c$$
$$\vdots$$
$$t_{TDOA,n} = t_{TOA,n} - t_{TOA,1} = T_n - T_1 + \|r_n - r_{Terminal}\|/c - \|r_1 - r_{Terminal}\|/c.$$

In these n−1 equations, the left hand sides are known, including some additional measurement error, provided that the time of transmission differences, also denoted the real time differences, may be measured. Furthermore, the locations of the Bss $r_i$, $i=1, \ldots, n$, may be surveyed to within a few meters and are thus known as well. What remains unknown is the UE location, i.e.:

$$r_{Terminal} = (x_{Terminal} y_{Terminal} z_{Terminal})^T.$$

In a more common case a two dimensional positioning is performed instead:

$$r_{Terminal} = (x_{Terminal} y_{Terminal})^T.$$

It then follows that at least three time of arrival differences are needed in order to find a UE position in three dimensions (3D) and that at least two time of arrival differences are needed in order to find a UE position in two dimensions (2D). This, in turn, means that at least four sites need to be detected for 3D UE positioning and at least three sites need to be detected for 2D UE positioning. In FIG. 2, three sites 210a-c are detected by the UE 250, and the UE position estimate is found as an intersection 230 of two hyperbolas 240a-b corresponding to the measured time differences. In practice, accuracy can be improved if more measurements are collected and a maximum likelihood solution is introduced. There may also be multiple false solutions in cases where only a minimum number of sites are detected; In FIG. 2 the two hyperbolas 240a and 240b actually have two intersections and the positioning does not give one correct solution. Another example is when there are three hyperbolas which do not intersect in the same point. If false solutions exist or not thus depends on the number of hyperbolas and on the geometry of the BSs involved. Observed TDOA (OTDOA) is the TDOA positioning method that has been standardized for LTE in 3GPP Rel-9.

Figure 1B:
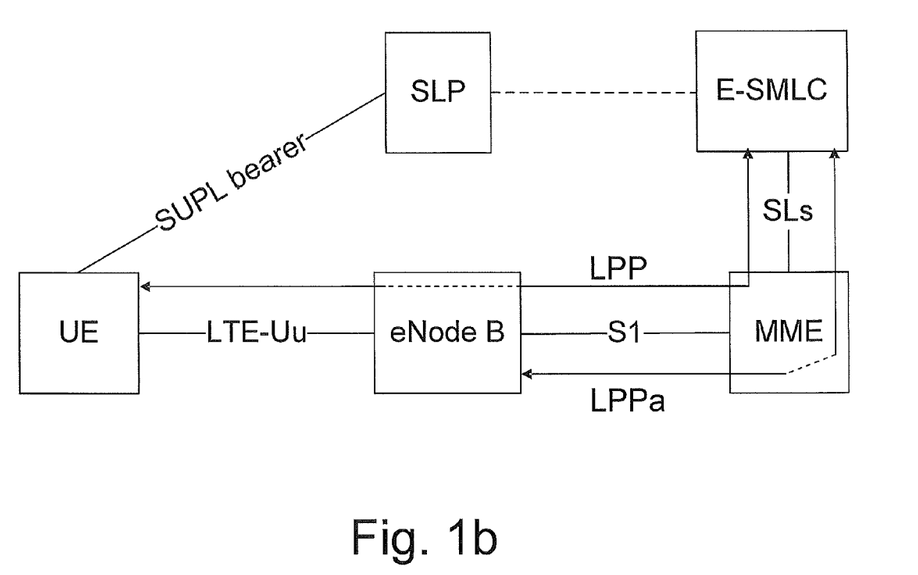
FIG. 1b is a block diagram schematically illustrating the positioning architecture in LTE.

A positioning node is a physical or logical entity that manages positioning for a so called target device, e.g. a UE, and is in a control plane architecture referred to as an Evolved Serving Mobile Location Center (E-SMLC). As illustrated in FIG. 1a, the E-SMLC 140 may be a separate network node connected to the MME 130, but it may also be a functionality integrated in some other network node. An overview of the positioning architecture in LTE is shown in FIG. 1b. As already mentioned, the E-SMLC is the control plane network node for positioning. The corresponding user plane node is the Secure User Plane Location (SUPL) Location Platform (SLP). Both the E-SMLC and SLP node can communicate with the UE over the LTE Positioning Protocol (LPP). This communication is transparent to the serving eNodeB. The LPPa protocol may be used by the E-SMLC to derive the eNodeB configurations or eNodeB based positioning solution. When receiving a OTDOA positioning request, the E-SMLC may e.g. request positioning related parameters from eNodeB via LPPa. The E-SMLC then assembles and sends assistance data and the request for the positioning to the target wireless device, e.g. the UE, via LPP. The assistance data is provided to the UE in a transparent manner for the serving eNodeB.

To enable positioning in LTE and facilitate positioning measurements of a proper quality and for a sufficient number of distinct locations, new physical signals dedicated for positioning, so called positioning reference signals (PRS) have been introduced. To improve hearability of the PRS, i.e., to enable detecting the PRS from multiple sites and with a reasonable quality, positioning sub frames have been designed as low-interference sub frames. It has thus also been agreed that no data transmissions are allowed in general in positioning sub frames.

Figure 3:
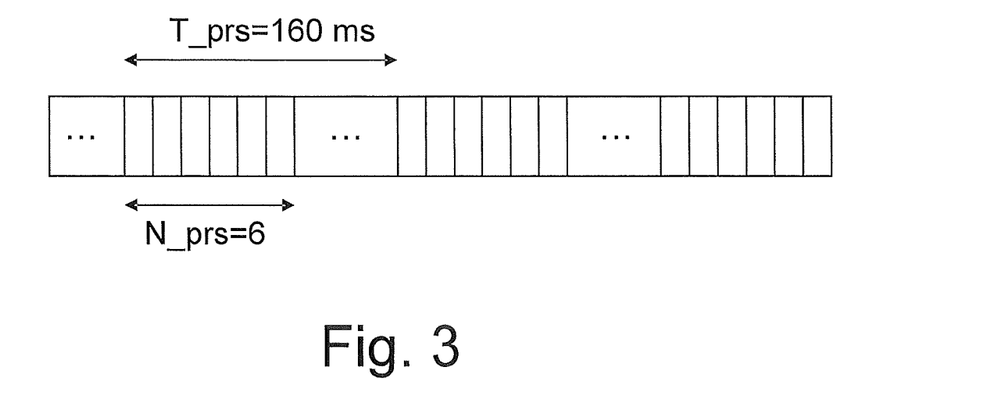
FIG. 3 is a schematic illustration of positioning sub frame allocations in time for a cell.

To limit the system impact of using OTDOA in the network, the PRS may be configured to be transmitted very seldom in time. The current possible configurations are a set of sub frames with PRS, referred to as a positioning occasion, every 160 ms, 320 ms, 640 ms and 1280 ms. The set of sub frames with PRS may be 1, 2, 4 or 6 consecutive downlink sub frames. FIG. 3 illustrates positioning occasions of N_prs=6 consecutive sub frames, occurring every T_prs=160 ms.

As PRS from multiple distinct locations need to be measured for OTDOA positioning, the UE receiver may have to deal with received PRS that are much weaker than those received from the serving cell. Furthermore, without the approximate knowledge of when the measured signals are expected to arrive in time and what is the exact PRS pattern, the UE would need to do signal search within a large window which would impact the time and accuracy of the measurements as well as the UE complexity. To facilitate UE measurements, the network transmits assistance data to the UE, which includes among others, reference cell information, neighbor cell list containing physical cell identities of neighbor cells, the number of consecutive downlink sub frames (N_prs), PRS transmission bandwidth and frequency.

The UE measures the observed time difference between the cells provided in the assistance data compared to a reference cell. The reference cell is also part of the assistance data. With OTDOA, the UE measures Reference Signal Time Difference (RSTD) which is a relative timing difference between a neighbor cell and a reference cell. In LTE Rel-9 the UE feedbacks these observed time difference measurements to the E-SMLC or SUPL node, which calculates the positioning of the UE. From a theoretical perspective it would also be possible to let the UE calculate its own positioning and feedback the position back to the E-SMLC and the SUPL node.

Energy Saving Mode for BS

The LTE Rel-8 and subsequent releases are standardized for many different transmission bandwidths. In Rel-8 and Rel-9 the defined transmission bandwidths span from 1.4 MHz to 20 MHz. While a large transmission bandwidth is needed during times of high load, the large transmission bandwidth does not provide benefits during low load situations. On the contrary, a large transmission bandwidth implies higher energy consumption since Cell specific Reference Signals (CRS) need to be transmitted over the full system bandwidth at all time. It is therefore desirable to tune the transmission bandwidth depending on the available load.

The transmission bandwidth of a cell is contained in the system information transmitted on the Physical Broadcast Channel (PBCH). However, there is no procedure defined for how a UE shall behave in case of a transmission bandwidth change for a cell. Therefore, it is in practice not possible to change the bandwidth of a cell. Instead, to reduce the bandwidth of a cell served by a certain BS, a new narrow-band cell that is transmitted from the same physical BS may be added, and the current wide-band cell may be removed.

Adding a new cell is a procedure that requires no additional hardware in the BS. Thus, even though it is not possible to change the bandwidth of an LTE cell, it is possible to add and remove cells of different bandwidths in order to adapt e.g. the bandwidth to the current capacity requirement, thus making it possible to save energy during periods of low capacity need.

However, such energy saving methods implies that an eNodeB will transmit its signals with different transmission bandwidths depending on if it is in an energy saving mode or not. This may then affect all UEs in neighboring cells that are performing OTDOA measurements including a measurement of PRS from this eNodeB. The UEs and the eNodeB may in this case have a different understanding of the transmitted bandwidth. The UEs thus need to be informed about that the measured eNodeB has changed its transmission bandwidth, in order for them to be able to update the measured bandwidth for positioning. The UEs may only get this information if the SLP and E-SMLC are aware of the eNodeB's changes between the energy saving mode and the high capacity mode. Such a solution would be very complicated as the eNB needs to continuously update E-SMLC and SLP node about it energy saving status. Furthermore, the SLP node may not be directly under radio access network control, which may set further limits on what is possible. Another problem is that the UE OTDOA measurement performance is connected to the PRS transmission bandwidth. The larger the transmission bandwidth for PRS is, the better is the performance. Therefore, if the eNodeB would lower its transmission bandwidth, it would also lower the OTDOA performance. This is not desirable even if the network for the time being is low loaded, since the OTDOA measurements may be related to the positioning of a UE for a call to E-911, and for such situations an exact positioning is critical.

SUMMARY

It is therefore an object to address some of the problems outlined above, by allowing a base station to save energy by switching from transmitting signals associated with a first cell to transmitting signals associated with a second cell configured to have a lower transmission capacity than the first cell, while continuing to transmit at least positioning reference signals associated with the first cell and thus still supporting positioning measurements with a same performance. This object and others are achieved by the method and the base station according to the independent claims, and by the embodiments according to the dependent claims.

In accordance with one embodiment, a method in a base station of a wireless communications system for supporting user equipment positioning measurements is provided. The method comprises transmitting signals associated with a first cell, the transmitted signals comprising positioning reference signals. The method also comprises transmitting signals associated with a second cell, wherein the second cell is configured to have a lower transmission capacity than the first cell, and discontinuing the transmission of at least one signal associated with the first cell except for the positioning reference signals.

In accordance with another embodiment, a base station configured to be used in a wireless communications system is provided. The base station is also configured to support positioning measurements, and comprises a transmitter configured to transmit signals associated with a first cell, the transmitted signals comprising positioning reference signals. The transmitter is also configured to transmit signals associated with a second cell, wherein the second cell is configured to have a lower transmission capacity than the first cell, and to discontinue the transmission of at least one signal associated with the first cell except for the positioning reference signals.

An advantage of embodiments is that the energy consumption of a base station may be reduced when the traffic is low by means of adding cells with different transmission capacity, without negatively affecting network assisted positioning mechanisms such as OTDOA.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of a method and device, they may also be embodied in a computer program product as well as in a system comprising a computer processor and a memory coupled to the processor, wherein the memory is encoded with one or more programs that may perform the functions disclosed herein.

Embodiments are described in a non-limiting general context in relation to an LTE network applying PRS for OTDOA positioning measurements. In an example scenario, an eNodeB transmits signals in a first cell and then switches to a second Energy Efficient (EE) cell, where the EE cell is configured to have a smaller bandwidth and thus a lower transmission capacity than the first cell. However, it should be noted that the embodiments may also be applied to other types of radio access networks with support for positioning, and also to other configurations of EE cells, such as EE cells configured with a lower number of antenna ports.

In this disclosure, a cell is the sum of signals transmitted by a BS, the signals being associated with the cell through a cell identity such as the Physical Cell Identity (PCI). The cell is thus not defined only as the coverage area of the BS.

As already described above in the background section, it is not possible to reduce the bandwidth of a cell served by a certain BS in order to adapt to a reduced need for capacity and thereby to reduce the BS's energy consumption. Furthermore, it is not possible to reduce the number of antenna ports used for the transmission in a cell either.

Instead, a second EE cell with a smaller bandwidth and using only one antenna port, transmitted from the same physical BS may be added, and the current wide-band and multi-antenna port cell may be removed. Adding a new cell is a simple procedure that requires no additional hardware in the BS. A new narrow band EE cell is added, and it is ensured that all active UEs perform a handover to the EE cell before closing down the normal cell. As the bandwidth reduction is triggered when the load in the cell is low, the probability is high that there are no UEs to handover. When the capacity need increases again, the normal first cell with a larger bandwidth and thus configured for a higher capacity is started again, active UEs are handed over from the second EE cell to the first cell, and the EE cell is closed down.

However, the reduction of the bandwidth has the drawback of resulting in less accurate positioning measurements, as PRSs are also transmitted with a smaller bandwidth in the EE cell. The problem of how to allow a BS to save energy by adding a second EE cell, and switching from transmission of signals associated with a first cell to transmission of signals associated with the added second EE cell, without affecting positioning measurement accuracy, is addressed by a solution where the BS continues to transmit PRS associated with the first cell, and discontinues to transmit all or at least a few of the other signals associated with the first cell.

Figure 6A:
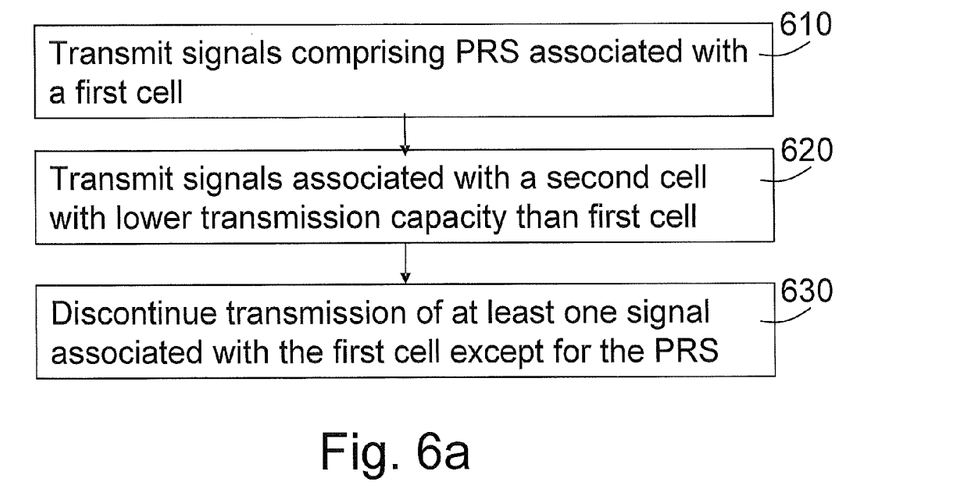
FIGS. 6a-6b are flowcharts of the method in the BS according to embodiments.

FIG. 6a is a flowchart of the method in a BS of a wireless communications system, for supporting UE positioning measurements, according to embodiments. In one embodiment, the BS may be an eNodeB in an E-UTRAN. The method comprises:

610: Transmit signals associated with a first cell, the transmitted signals comprising PRSs. In one embodiment, the PRSs are associated with the first cell by a first cell identity. This may e.g. be the PCI.

620: Transmit signals associated with a second cell, wherein the second cell is configured to have a lower transmission capacity than the first cell. The second cell is thus an EE cell, as a lower transmission capacity allows for reduced energy consumption.

630: Discontinue the transmission of at least one signal associated with the first cell except for the PRSs. In order to keep a good performance for positioning measurements, the reference signals used for positioning, such as the specifically defined PRS for positioning in LTE, will still be transmitted in the first cell. However, the transmission of all other signals associated with the first cell, or at least a part of those signals, will be discontinued in order to save energy.

Figure 5A:
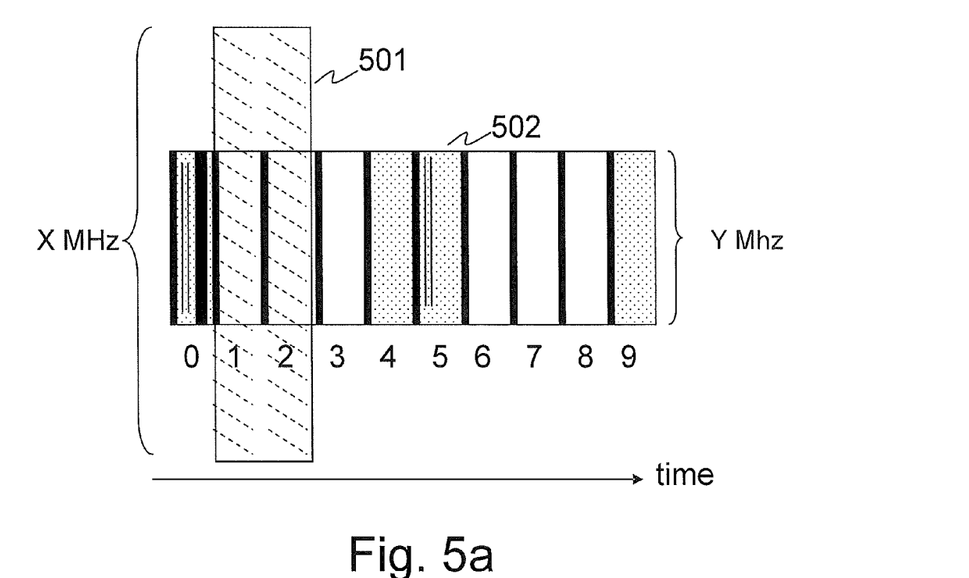
FIGS. 5a-5c are schematic illustrations of different time and/or frequency offsets between a first and second cell.

In a first embodiment, the second cell may be configured to have a lower transmission capacity by using a smaller bandwidth than the first cell. As an example, the first cell may be configured to use a 20 MHz bandwidth, and the second EE cell may be configured to use only 1.4 MHz. FIG. 5a illustrates one possible embodiment where a BS is transmitting all signals corresponding to a second narrow band EE cell 502, configured to use Y MHz and optimized for low energy consumption, and in addition also the PRSs of the original first cell 501, configured to use X MHz, where X>Y. The actual sequence that constitutes the PRS may be directly derived from the PCI of the first cell. Since the PCIs need to be locally unique the second EE cell 502 and the first cell 501 will have different PCIs. Hence the BS transmits signals corresponding to two different cells.

In a second embodiment, the second cell may be configured to have a lower transmission capacity by using a lower number of antenna ports than the first cell. The first cell may e.g. be configured to use four antenna ports for the transmission of signals, while the second EE cell may be configured to use only one port to reduce the transmission capacity and thereby save energy.

A BS covering a certain area with three sector cells using three sector antennas consumes more energy than a BS with an omni directional antenna covering the same area with one omni cell, as each sector antenna needs its own power amplifier while the omni directional antenna only needs one power amplifier. One way to save energy is thus to replace two or more sector cells covering an area with an omni cell covering the same area, although this also reduces the transmission capacity. However, this may be a good alternative when the load is low. Therefore in a third embodiment, the second cell is configured to have a lower transmission capacity by covering a larger area than the first cell. In one example of the third embodiment, the BS will limit the number of cells it will transmit. If the BS controls three different cells in three different sectors, all these cells may be turned off and replaced by an omni cell instead for energy saving purposes. The new EE cell, i.e. the omni cell, will thus cover a larger area than any of the original first cells did. In case one or several of the original sectors transmits PRS at certain positioning occasions, they will continue to do so with the same settings after the sectors are turned off for energy saving purposes. In the BS this may be implemented by turning off the radio transmitters associated with the different sectors during all occasions except the positioning occasions when the PRSs are transmitted. During the positioning occasions, the radio transmitters associated with the different sectors will shortly be turned on to only transmit the PRS.

In a fourth embodiment, the second cell is configured to have a lower transmission capacity by defining more Multicast/Broadcast Single Frequency Network (MBSFN) sub frames than the first cell. MBSFN sub frames have been introduced in LTE for supporting a multicast/broadcast feature allowing sending a same broadcast signal to all or many UEs. A cell may be configured with up to six MBSFN sub frames in a radio frame. When not used for the MBSFN feature, the MBSFN sub frames are not read by the UE, and just a small control region needs to be transmitted in the MBSFN sub frame. MBSFN sub frames may thus be defined in a cell to avoid sending CRS. This will allow for energy savings in the BS as well as for reduced pilot interference from a certain cell. With six MBSFN sub frames defined for the cell the transmission capacity will be low. However the BS energy consumption related to the cell will also be low, and hence this is an efficient mode of network operation when the traffic load is low. In FIG. 5a a radio frame comprising 10 sub frames numbered 0 to 9 is illustrated for the second EE cell 502. The control region in the first part of each sub frame is marked in black. Sub frames 1-3 and 6-8 are defined as MBSFN sub frames, and are thus free from CRS. Sub frames 0, 4-5 and 9 all contain CRS, shown as dots in the sub frames. Sub frames 0 and 5 also comprises other signaling marked in black such as synchronization signals and signaling of broadcast information.

The first, second, third and fourth embodiments may also be combined with each other in any possible way. An EE cell may for example be defined to transmit with the maximum of six MBSFN sub frames, with the smallest possible bandwidth of 1.4 MHz, and using only one antenna port, thus combining the first, second and fourth embodiment.

In a further embodiment, the signals associated with the second cell may be transmitted with a time offset compared to the first cell. Furthermore, the signals associated with the second cell may also or alternatively be transmitted with a frequency offset compared to the first cell. The time and/or frequency offset may be chosen such that an overlap of channel resources allocated for signals associated with the first cell, and channel resources allocated for signals associated with the second cell is reduced.

Figure 5B:
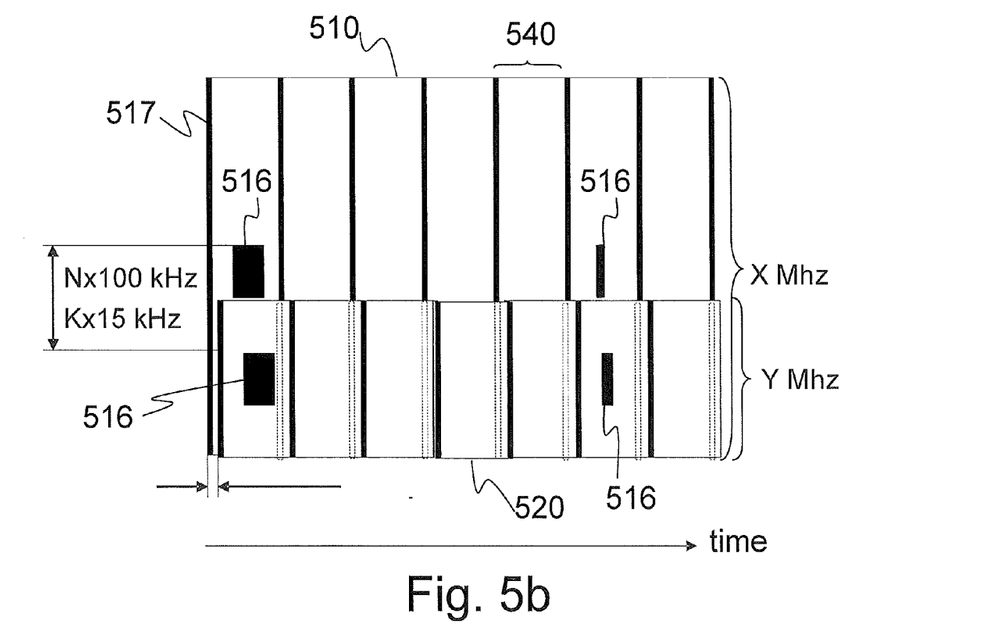
Figure 5C:
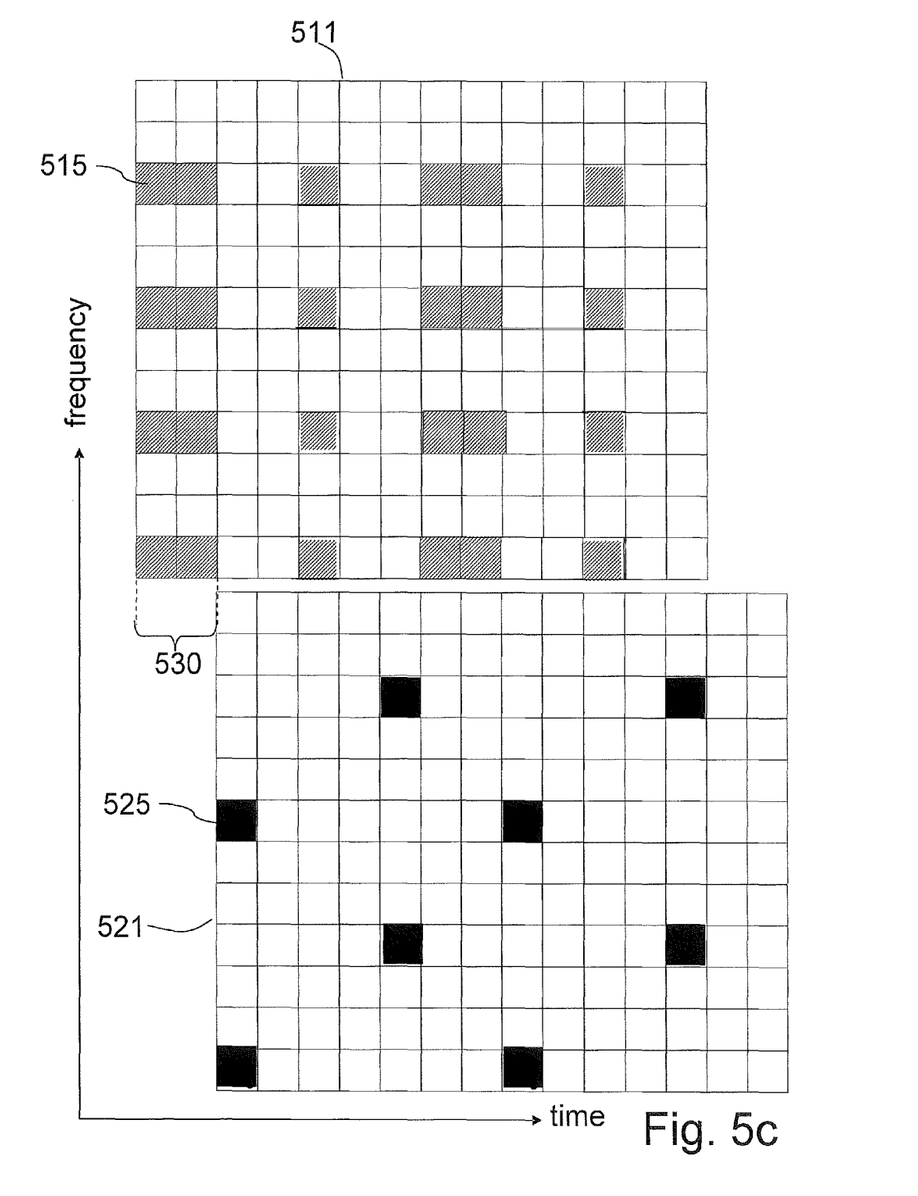

FIG. 5b illustrates an example of how the time and frequency offset of a second EE cell 520 may be carefully selected so that allocated resources do not overlap with allocated resources in a first cell 510. A number of sub frames 540 are shown for each cell. Cells in LTE need to be located on a 100 kHz raster in order to reduce the complexity for cell search. Furthermore, since the sub-carrier in LTE is 15 kHz it is beneficial if both the added second cell and the original first cell are placed on the same 15 kHz raster as well. In FIG. 5b the first cell 510 is a wide-band cell with a bandwidth of X MHz, configured to use four antenna ports, and the second cell 520 is a narrow-band cell with a bandwidth of Y MHz (X>Y), configured to use only one antenna port. The two cells are schematically illustrated in a time-frequency grid. The time and frequency offset is chosen such that the control region 517 signaled in the beginning of each sub frame as well as the signaling of broadcast information and synchronization signals 516 in the first and sixth sub frame do not overlap between the two cells. Furthermore, FIG. 5c illustrates schematically one resource block pair from the first cell 511, and one from the second cell 521 in an enlarged view of the time-frequency grid. The resource elements 515 carrying CRS for the first cell 510 are striped, and the resource elements 525 carrying CRS for the second cell 520 are black. The first cell 510 has four times more CRS than the second cell 520, as it is configured to use four antenna ports compared to just one antenna port for the second cell. The choice of a time offset 530 of two symbols between the cells makes it possible to avoid collision of CRS as well. In case no data is transmitted in any of the cells then it is thus possible to select a time and frequency shift such that no resource elements would overlap. The relevant resource elements are the ones used for downlink channels, which in E-UTRAN may be Primary Synchronization Signals (PSS), Secondary Synchronization Signals (SSS), Physical Broadcast Channels (PBCH), Physical Downlink Control Channels (PDCCH), Physical Hybrid automatic repeat request Indicator Channels (PHICH), Physical Control Format Indicator Channels (PCFICH), and CRS.

Figure 4:
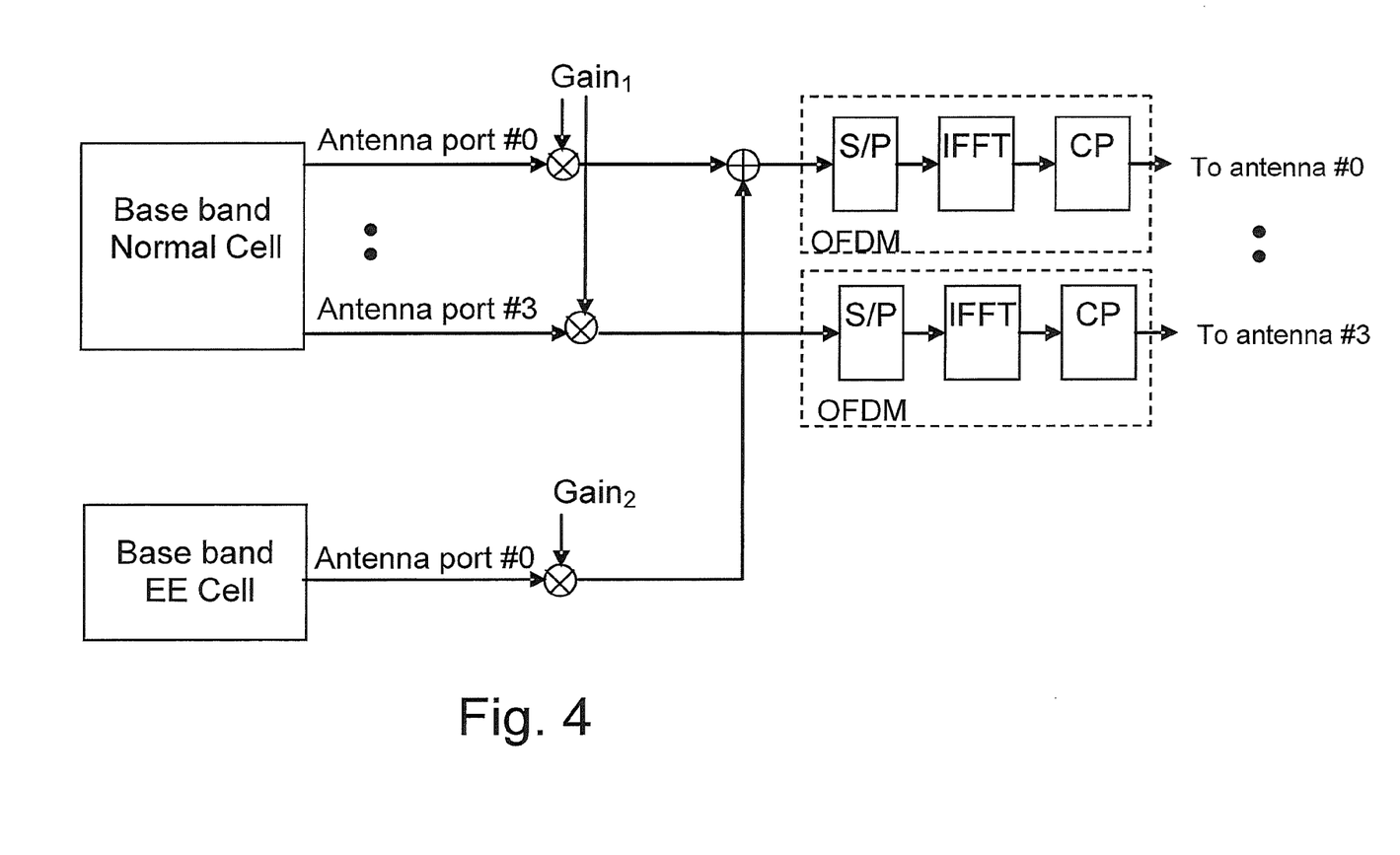
FIG. 4 is a block diagram schematically illustrating an energy efficient cell inserted in the digital base band.

A cell optimized for low energy consumption will typically have a small bandwidth, use a single antenna port, and be configured with six MBSFN sub frames. If both cells are placed on the same 15 kHz grid, as discussed above, then it is even possible to insert the second EE cell in the digital base-band before the Orthogonal Frequency Division Multiplexing (OFDM) modulator in the BS, as illustrated in FIG. 4.

Another possible choice of time offset between the two cells, is to choose the time offset such that an overlap in time of channel resources allocated for the PRSs associated with the first cell, and channel resources allocated for MBSFN transmissions associated with the second cell is achieved. In this way, the overlap between resources allocated for PRSs and resources allocated in the second cell is minimized in order to reduce interference, as the MBSFN sub frames do not carry reference signals or useful signals that may disturb the transmission of PRS in the first cell, or vice versa. One example of such a time offset choice is illustrated in FIG. 5a, where the PRS transmitted in the first cell 501 overlaps with the MBSFN sub frames number 1 and 2.

Figure 6B:
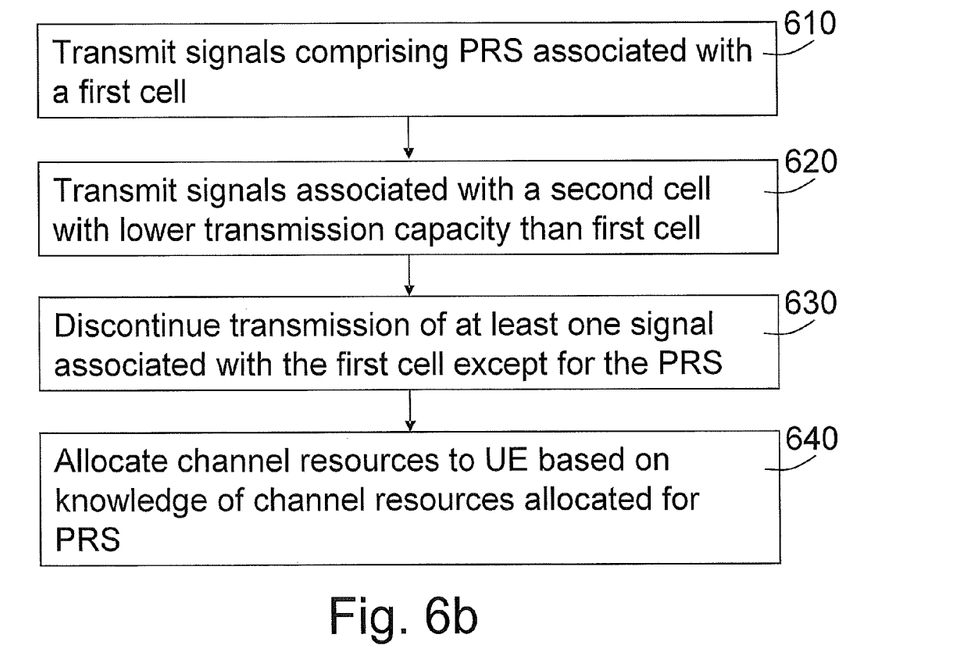

FIG. 6b is a flowchart of the method in the BS, according to one embodiment. The method comprises the same steps 610-630 as described above with reference to FIG. 6a, and the additional step 640 of allocating channel resources to a UE in the second cell based on knowledge regarding channel resources allocated for the PRSs associated with the first cell, such that an overlap of channel resources between the first and the second cell is reduced. In this way the BS may make a smart allocation of resources to the UE, as it knows about the PRS resources transmitted in the first cell, such that an overlap is avoided.

Figure 7A:
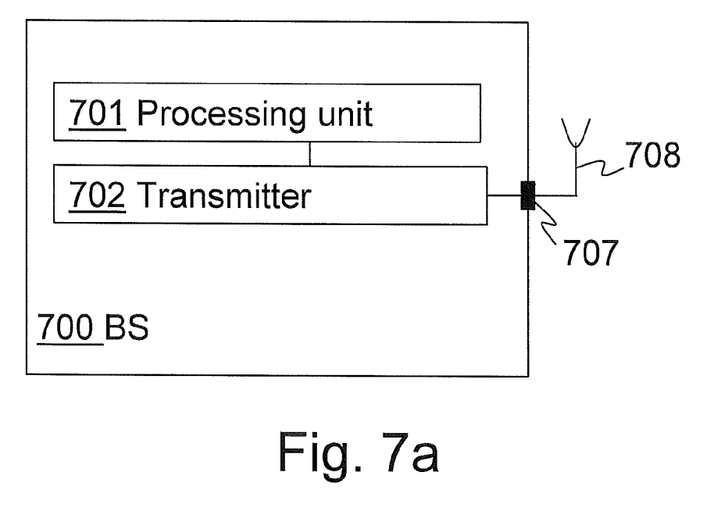
FIGS. 7a-7b are block diagrams illustrating the BS according to embodiments.

A BS 700 configured to be used in a wireless communications system, and to support positioning measurements is schematically illustrated in the block diagram in FIG. 7a, according to embodiments. The BS is in one embodiment an eNodeB in an E-UTRAN. The BS 700 comprises a transmitter 702 configured to transmit signals associated with a first cell, the transmitted signals comprising PRSs. The PRSs may be associated with the first cell by a first cell identity. In FIG. 7a, the transmitter 702 is connected to an antenna 708 via an antenna port 707. However, there may be more than one antenna and/or antenna ports. The transmitter 702 is also configured to transmit signals associated with a second cell, wherein the second cell is configured to have a lower transmission capacity than the first cell. Furthermore, the transmitter 702 is configured to discontinue the transmission of at least one signal associated with the first cell except for the PRSs.

According to the first embodiment described above, the second cell is configured to have a lower transmission capacity by using a smaller bandwidth than the first cell. According to the second embodiment, the second cell is configured to have a lower transmission capacity by using a lower number of antenna ports than the first cell. According to the third embodiment, the second cell is configured to have a lower transmission capacity by covering a larger area than the first cell. According to the fourth embodiment, the second cell is configured to have a lower transmission capacity by defining more multicast/broadcast single frequency network, MBSFN, sub frames than the first cell. The first, second, third and fourth embodiments may be combined with each other in any possible way.

According to embodiments, the transmitter is configured to transmit the signals associated with the second cell with a time offset compared to the first cell. The transmitter may also or alternatively be configured to transmit the signals associated with the second cell with a frequency offset compared to the first cell.

In one embodiment, the BS further comprises a processing unit 701 configured to allocate channel resources to a UE in the second cell based on information regarding channel resources allocated for the PRSs associated with the first cell, such that an overlap of channel resources in the first and second cell is reduced.

The units described above with reference to FIG. 7a may be logical units, physical units or a mix of logical and physical units.

Figure 7B:
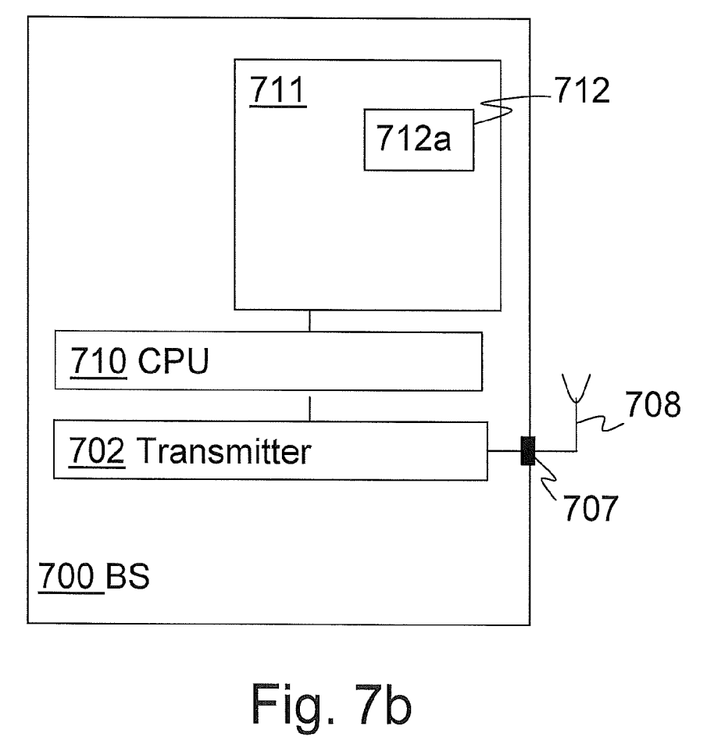

FIG. 7b schematically illustrates an embodiment of the BS 700, which is an alternative way of disclosing the embodiment illustrated in FIG. 7a. The BS 700 comprises a transmitter 702 connected to an antenna 708 via an antenna port 707, as already described above with reference to FIG. 7a. The BS 700 also comprises a Central Processing Unit (CPU) 710 which may be a single unit or a plurality of units. Furthermore, the BS 700 comprises at least one computer program product 711 in the form of a non-volatile memory, e.g. an EEPROM (Electrically Erasable Programmable Read-Only Memory), a flash memory or a disk drive. The computer program product 711 comprises a computer program 712, which comprises code means which when run on the BS 700 causes the CPU 710 on the BS 700 to perform steps of the procedure described earlier in conjunction with FIG. 6b.

Hence in the embodiment described, the code means in the computer program 712 of the BS 700 comprises a module 712a for allocating channel resources to a UE in the second cell based on knowledge regarding channel resources allocated for the PRS. The code means may thus be implemented as computer program code structured in computer program modules. The module 712a essentially performs the step 640 of the flow in FIG. 6b to emulate the first BS described in FIG. 7a. In other words, when the module 712a is run on the CPU 710, it corresponds to the processing unit 701 of FIG. 7a.

Although the code means in the embodiment disclosed above in conjunction with FIG. 7b is implemented as a computer program module, it may in alternative embodiments be implemented at least partly as a hardware circuit.

The above mentioned and described embodiments are only given as examples and should not be limiting. Other solutions, uses, objectives, and functions within the scope of the accompanying patent claims may be possible.

ABBREVIATIONS

3GPP 3rd Generation Partnership Project
BS Base Station

CPU Central Processing Unit
CRS Cell specific Reference Signal
EE Energy Efficient
EEPROM Electrically Erasable Programmable Read-Only Memory
eNodeB E-UTRAN NodeB
E-SMLC Enhanced Serving Mobile Location Centre
E-UTRAN Evolved UTRAN
GSM Global System for Mobile communications
LPP LTE Positioning Protocol
LPPa LTE Positioning Protocol a
LTE Long Term Evolution
MME Mobility Management Entity
OTDOA Observed Time Difference of Arrival
PBCH Physical Broadcast Channel
PCFICH Physical Control Format Indicator Channel
PCI Physical Cell Identity
PDCCH Physical Downlink Control Channel
PHICH Physical Hybrid automatic repeat request Indicator Channel
PRS Positioning Reference Signal
PSS Primary Synchronization Signal
SLP SUPL Location Platform
SSS Secondary Synchronization Signal
SUPL Secure User Plane Location
UE User Equipment
UMTS Universal Mobile Telecommunication System
UTRAN Universal Terrestrial Radio Access Network

The invention claimed is:

1. A method, in a base station of a wireless communications system, for supporting user equipment positioning measurements, the method comprising:
    transmitting, by the base station, signals associated with a first cell, the transmitted signals comprising positioning reference signals;
    transmitting, by the base station, signals associated with a second cell, wherein the second cell is configured to have a lower transmission capacity than the first cell;
    discontinuing, by the base station, the transmission of at least one signal associated with the first cell except for the positioning reference signals,
    wherein the discontinuing the transmission of at least one signal comprises continuing to transmit broadcast information and/or synchronization signals associated with the first cell.

2. The method of claim 1, wherein the second cell is configured to have a lower transmission capacity by using a smaller bandwidth than the first cell.

3. The method of claim 1, wherein the second cell is configured to have a lower transmission capacity by using a lower number of antenna ports than the first cell.

4. The method of claim 1, wherein the second cell is configured to have a lower transmission capacity by covering a larger area than the first cell.

5. The method of claim 1, wherein the second cell is configured to have a lower transmission capacity by defining more multicast/broadcast single frequency network (MBSFN) sub frames than the first cell.

6. The method of claim 1, wherein the positioning reference signals are associated with the first cell by a first cell identity.

7. The method of claim 1, wherein the signals associated with the second cell are transmitted with a time offset compared to the signals associated with the first cell.

8. The method of claim 1, wherein the signals associated with the second cell are transmitted with a frequency offset compared to the signals associated with the first cell.

9. The method of claim 1, further comprising allocating channel resources to a user equipment in the second cell based on knowledge regarding channel resources allocated for the positioning reference signals associated with the first cell, such that an overlap of channel resources between the first and the second cell is reduced.

10. The method of claim 1, wherein the base station is an eNodeB in an evolved universal terrestrial radio access network (E-UTRAN).

11. A base station configured to be used in a wireless communications system, and to support positioning measurements, the base station comprising a transmitter, a processor and a memory, the memory containing instructions executable by the processor whereby the base station is configured to:
    transmit signals associated with a first cell, the transmitted signals comprising positioning reference signals;
    transmit signals associated with a second cell, wherein the second cell is configured to have a lower transmission capacity than the first cell;
    discontinue the transmission of at least one signal associated with the first cell except for the positioning reference signals,
    wherein the discontinuing the transmission of at least one signal comprises continuing to transmit broadcast information and/or synchronization signals associated with the first cell.

12. The base station of claim 11, wherein the second cell is configured to have a lower transmission capacity by using a smaller bandwidth than the first cell.

13. The base station of claim 11, wherein the second cell is configured to have a lower transmission capacity by using a lower number of antenna ports than the first cell.

14. The base station of claim 11, wherein the second cell is configured to have a lower transmission capacity by covering a larger area than the first cell.

15. The base station of claim 11, wherein the second cell is configured to have a lower transmission capacity by defining more multicast/broadcast single frequency network (MBSFN) sub frames than the first cell.

16. The base station of claim 11, wherein the positioning reference signals are associated with the first cell by a first cell identity.

17. The base station of claim 11, wherein the memory contains instructions executable by the processor whereby the base station is configured to transmit the signals associated with the second cell with a time offset compared to the signals associated with the first cell.

18. The base station of claim 11, wherein the memory contains instructions executable by the processor whereby the base station is configured to transmit the signals associated with the second cell with a frequency offset compared to the signals associated with the first cell.

19. The base station of claim 11, wherein the memory contains instructions executable by the processor whereby the base station is configured to allocate channel resources to a user equipment in the second cell based on information regarding channel resources allocated for the positioning reference signals associated with the first cell, such that an overlap of channel resources in the first and second cell is reduced.

20. The base station of claim 11, wherein the base station is an eNodeB in an evolved universal terrestrial radio access network (E-UTRAN).

21. The method of claim 1, wherein the discontinuing the transmission of at least one signal comprises continuing to transmit the synchronization signals associated with the first cell, and the method comprising choosing a frequency offset so that synchronization signals associated with the first cell and synchronization signals associated with the second cell do not overlap in resource allocation.

22. The method of claim 1, wherein the discontinuing the transmission of at least one signal comprises continuing to transmit the broadcast information associated with the first cell, and the method comprising choosing a frequency offset so that broadcast information associated with the first cell and broadcast information associated with the second cell do not overlap in resource allocation.

23. The method of claim 1, wherein the method comprises transmitting the positioning reference signals at a plurality of positioning occasions associated with one or more settings of the first cell both before and after the discontinuing of the transmission of at least one signal associated with the first cell.

24. The base station of claim 11, wherein the memory contains instructions executable by the processor whereby the base station is configured to:
transmit the positioning reference signals associated with the first cell at a plurality of positioning occasions;
transmit the at least one signal at a plurality of other occasions besides the positioning occasions; and
discontinue the transmission of the at least one signal associated with the first cell except for the positioning reference signals by turning the transmitter on during the plurality of positioning reference occasions and turning the transmitter off during the plurality of other occasions.

25. The base station of claim 11, wherein the memory contains instructions executable by the processor whereby the base station is configured to continue to transmit the positioning reference signals associated with the first cell in resources allocated for multicast/broadcast single frequency network (MBSFN) sub frames associated with the second cell, wherein the allocated MBSFN subframes do not carry reference signals that would disrupt the transmission of the positioning reference signals.

26. The base station of claim 11, wherein positioning reference signals are specifically designed to be a signal on which positioning measurements are performed.

27. The base station of claim 11, wherein the positioning reference signals are LTE positioning reference signals.

28. The method of claim 1, wherein the positioning reference signals are generated with a cell identifier for the first cell that is different from a cell identifier for the second cell.

29. The method of claim 1, wherein discontinuing the transmission of at least one signal associated with the first cell comprises discontinuing a cell specific reference signal (CRS) associated with the first cell.

30. The base station of claim 11, wherein the positioning reference signals are generated with a cell identifier for the first cell that is different from a cell identifier for the second cell.

31. The base station of claim 11, wherein the memory contains instructions executable by the processor whereby the base station is configured to discontinue the transmission of at least one signal associated with the first cell by discontinuing a cell specific reference signal (CRS) associated with the first cell.

* * * * *